UNITED STATES PATENT OFFICE.

ANDREW J. RUNYAN, OF ASHLAND, INDIANA.

IMPROVED MEDICAL COMPOSITION.

Specification forming part of Letters Patent No. 53,348, dated March 20, 1866.

*To all whom it may concern:*

Be it known that I, ANDREW J. RUNYAN, of Ashland, in the county of Henry and State of Indiana, have invented a new and useful Composition of Matter, which I denominate "Runyan's Cough Conqueror," for use as an expectorant; and I do hereby declare that the following is a full, clear, and exact description of the mode of compounding the same.

Specimens of the ingredients and a specimen of the composition are herewith filed.

With four and one-half pounds of the root of Indian hemp, (*Apocynum cannabinum*,) weighed when green, take seven ounces of hops and one ounce of the herb lobelia. Place them in a kettle of suitable size and add water enough to cover them, and boil until the root is soft; then strain off the water. Add fresh water, and boil again about one-half of an hour. Then pour this decoction through a strainer and set away until the solid matter has settled. Then pour off the decoction carefully and boil down until reduced to a half-gallon in quantity. To the decoction thus prepared add three pints of rye whisky, also two and three-fourths pounds of crushed sugar and two table-spoonfuls of the essence of cinnamon or other flavoring matter.

In administering this preparation I give to an adult one table-spoonful four times a day; but it may be administered more frequently if necessary. To children in proportion.

What I desire to secure by Letters Patent is—

The composition of an expectorant from the ingredients compounded and prepared substantially as set forth.

In testimony whereof I have signed my name to this specification in the presence of two subscribing witnesses.

ANDREW J. RUNYAN.

Witnesses:
 E. JOHNSON,
 M. L. BUNDY.